US012294829B2

(12) United States Patent
Nelson

(10) Patent No.: US 12,294,829 B2
(45) Date of Patent: May 6, 2025

(54) AUTOMATIC HANDSFREE EXTENDABLE MICROPHONE IN EARBUDS AND/OR HEADSETS

(71) Applicant: Greggory Nelson, Framingham, MA (US)

(72) Inventor: Greggory Nelson, Framingham, MA (US)

( * ) Notice: Subject to any disclaimer, the term of this patent is extended or adjusted under 35 U.S.C. 154(b) by 271 days.

(21) Appl. No.: 18/138,094

(22) Filed: Apr. 23, 2023

(65) Prior Publication Data

US 2024/0357274 A1 Oct. 24, 2024

(51) Int. Cl.
*H04R 1/10* (2006.01)
*H04R 1/08* (2006.01)

(52) U.S. Cl.
CPC ............. *H04R 1/1075* (2013.01); *H04R 1/08* (2013.01)

(58) Field of Classification Search
CPC .. H04R 1/1075; H04R 1/08; H04R 2201/107; H04R 2420/07; H04R 1/1041
See application file for complete search history.

(56) References Cited

U.S. PATENT DOCUMENTS

| | | | |
|---|---|---|---|
| 6,728,387 | B1 | 4/2004 | Polito |
| 2007/0127736 | A1 | 6/2007 | Christoph |
| 2008/0044002 | A1 | 2/2008 | Bevirt |

OTHER PUBLICATIONS

Https://nsmo.io/products/nsmo-jr?variant=39576559616181&currency=USD&utm_medium=product_sync&utm_source=google&utm_content=sag_organic&utm_campaign=sag_organic&gclid=Cj0KCQiAyMKbBhD1ARIsANs7rEHQxyLC0n4XO75RB_bex2GZakZkSqH8LoVNkwu568DZdaHCbzq1xYlaAj9IEALw_wcB.

*Primary Examiner* — Tuan D Nguyen
(74) *Attorney, Agent, or Firm* — Michael Meyer; Jerome Drabiak; Edison Law Group

(57) ABSTRACT

A headset includes a body, and at least one earpiece is connected to the body. The at least one earpiece includes a speaker. An extendable rod is arranged on an inner or an outer surface of the main body, the extendable rod having a first end and a second end. A microphone is proximally arranged at a second end of the extendable rod. A sensor is arranged in the body, the sensor is configured to detect an incoming signal. An actuator is attached proximal to the first end of the extendable rod. The actuator is configured to extend and/or retract the extendable rod in response to an output signal from the sensor.

20 Claims, 6 Drawing Sheets

AUTOMATIC HANDSFREE EXTENDABLE MICROPHONE IN EARBUDS AND/OR HEADSETS

BACKGROUND

Technical Field

The present disclosure generally relates to earbuds and/or headsets. More particularly, the present disclosure is directed to microphones for personal listening devices for earbuds and/or headsets.

Description of the Related Art

Todays quality headsets will often include a microphone for two-way communication. The microphone is positioned so that when the headset is arranged on a user, there is a microphone in front of, or in close proximity to, the user's mouth. In a headset that includes a head band, the microphone may be attached to a rod that is oriented toward a user's mouth. In earplug type headsets that do not have a headband, such as the type that was used with older smartphones (and some current smartphones), the microphone is attached to one of the earplug wires at a location proximal to the earplugs, so that the microphone is in located in front of, or in close proximity to, the user's mouth to capture the user's voice.

However, more recent smartphones include wireless ear buds that may communicate with a smartphone by Bluetooth to receive the sound signals. The microphone used for speaking is arranged in part of at least one of the ear buds, which is much further from the user's mouth than wired earplugs and/or headsets with head bands. As a result of the increased distance between the microphone and the user's mouth, there is a much greater tendency for background noise to be picked up by the microphone. This background noise can drown out the user's voice in a loud environment. While the wireless earbuds provide for more freedom as they are not tethered to the smartphone by a wire and USB or lightning plug, the sound quality of the user's voice is often lower than if a wired headset were used.

SUMMARY

In one embodiment, a headset includes a body, and at least one earpiece is connected to the body. The at least one earpiece includes a speaker. An extendable rod is arranged on an inner or an outer surface of the main body, the extendable rod having a first end and a second end. A microphone is proximally arranged at a second end of the extendable rod. A sensor is arranged in the body, the sensor is configured to detect an incoming signal. An actuator is attached proximal to the first end of the extendable rod. The actuator is configured to extend and/or retract the extendable rod in response to an output signal from the sensor.

In an embodiment, wherein at least some of which can be combined with the proceeding embodiment, the sensor detects the incoming signal from a wirelessly coupled device.

In an embodiment, wherein at least some of which can be combined with the proceeding embodiments, the sensor detects the incoming signal in a wireless signal transmitted in one of Bluetooth, Bluetooth Low Energy (LE), 802.11(a) to end, WiFi 1 to WiFi 7, or near-field communication (NFC).

In an embodiment, wherein at least some of which can be combined with the proceeding embodiments, the sensor includes a voice activated sensor that outputs a signal to the actuator to control the extendable rod to extend and/or retract based on voice commands.

In an embodiment, wherein at least some of which can be combined with the proceeding embodiments, the actuator is a motor configured to control the extendable rod.

In an embodiment, wherein at least some of which can be combined with the proceeding embodiments, the actuator is an air pump configured to pneumatically control the extendable rod.

In an embodiment, wherein at least some of which can be combined with the proceeding embodiments, the actuator is a hydraulic pump configured to control the extendable rod.

In an embodiment, wherein at least some of which can be combined with the proceeding embodiments, the actuator is a solenoid configured to control the extendable rod.

In an embodiment, wherein at least some of which can be combined with the proceeding embodiments, an optical sensor is arranged in the extendable rod, the optical sensor is configured to detect a user's mouth and output a signal to the actuator.

In an embodiment, wherein at least some of which can be combined with the proceeding embodiments, the extendable rod includes a plurality of telescopically connected portions.

In an embodiment, wherein at least some of which can be combined with the proceeding embodiments, a headphone includes at least one earpiece having a speaker. A rod is connected to earpiece, the rod having a first end and a second end. A microphone is telescopically attached proximal to the second end of the rod. A sensor is arranged in the rod, the sensor is configured to detect an incoming signal; and an actuator is coupled to the first rod, the actuator is configured to extend and retract the telescopically attached microphone in response to an output signal from the sensor.

In an embodiment, wherein at least some of which can be combined with the proceeding embodiments, a method of manufacturing a headset with an automatic handsfree extendable microphone includes providing at least one earpiece to a body. A telescoping rod is connected to the body, the rod having a first end and a second end, and the rod is operative to extend and retract. A microphone is attached proximal to the second end of the rod. A sensor is arranged in the rod, the sensor is operative to detect an incoming signal. An actuator is coupled to the rod, the actuator is operative to extend and retract the rod having the microphone attached, in response to an output signal received by the sensor.

In an embodiment, wherein at least some of which can be combined with the proceeding embodiments, the actuator is a motor, and the method includes attaching a shaft to the motor and to the rod to extend and retract the rod.

In an embodiment, wherein at least some of which can be combined with the proceeding embodiments, the actuator is an air pump, and the method further includes attaching an air powered piston to the air pump and to the rod to extend and retract the rod.

In an embodiment, the method includes coupling an antenna to the sensor.

BRIEF DESCRIPTION OF THE DRAWINGS

The drawings presented herein show illustrative embodiments of the disclosure. They do not illustrate all embodiments. Other embodiments may be used in addition to or instead of the illustrative embodiments. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps. The drawings are not intended to depict every feature of every implementation nor relative dimensions of the depicted elements, and are not drawn to scale.

DETAILED DESCRIPTION

Figure 1:
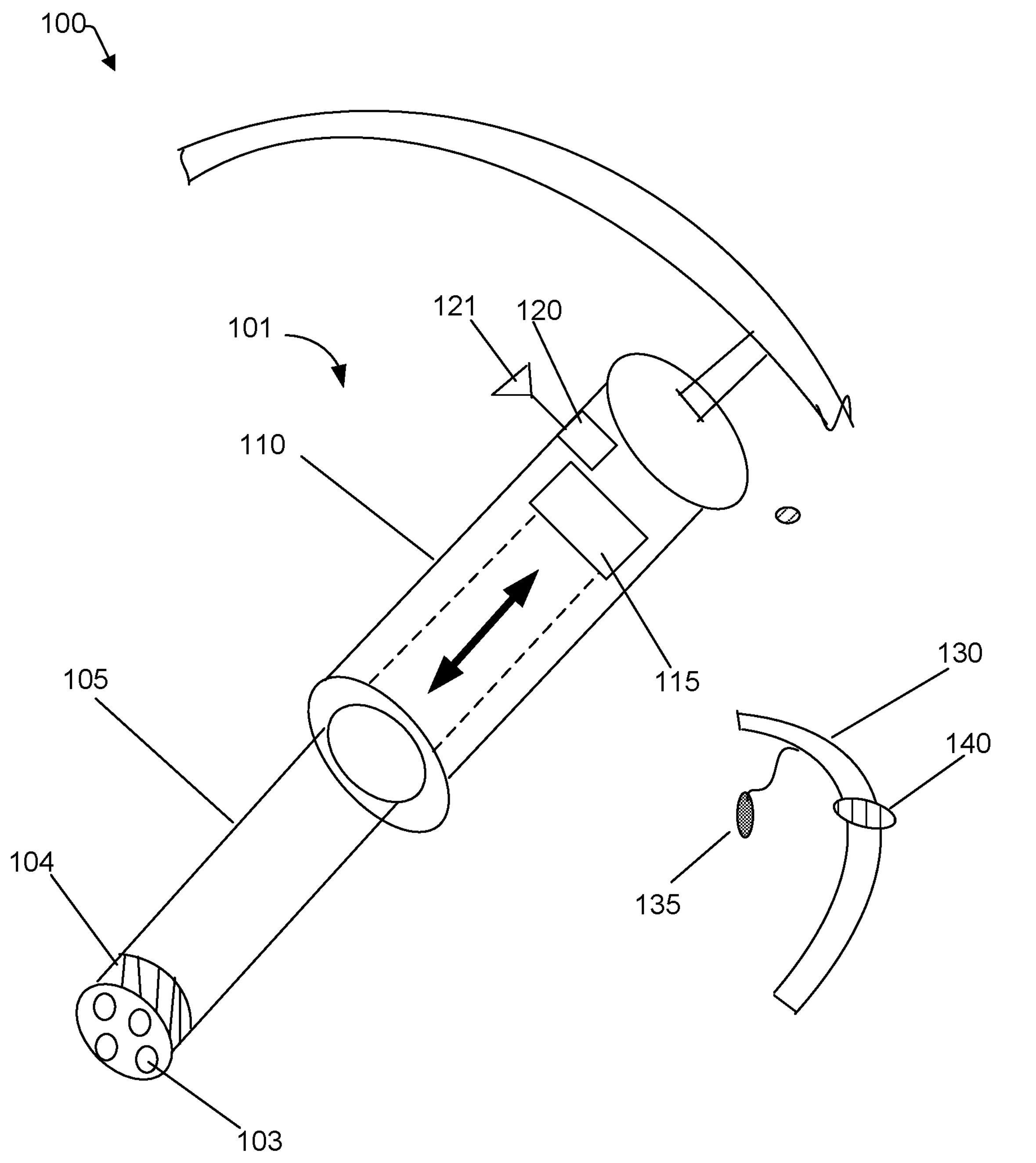
FIG. 1 is a perspective view of a headset with an extendable microphone, consistent with an illustrative embodiment.

In the following description, numerous specific details are set forth to clearly describe various specific embodiments disclosed herein. One skilled in the art, however, will understand that the subject matter of the present disclosure may be practiced without all of the specific details discussed below. In other instances, well-known features may not have been described so as not to obscure the invention with unnecessary detail regarding known features.

As used herein, the term "and/or" is to be interpreted broadly is to be understood to refer to all or some of the elements. For example, "at least one of (a) and/or (b) means the teaching pertains only to element (a), or only to element (b), or to both element (a) and element (b). In another example, "at least one of (a), (b), and/or (c), means the teaching pertains to only element (a), or only to element (b), or only element (c), or to elements (a) and (b), elements (a) and (c), elements (b) and (c), or to all of (a), (b) and (c).

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software. As such, it should be noted that a plurality of hardware and software-based devices, as well as a plurality of different structural components may be utilized to implement the subject matter of the present disclosure. Furthermore, and as described in subsequent paragraphs, the specific mechanical configurations illustrated in the drawings are intended to exemplify embodiments of the subject matter of the present disclosure.

Overview

FIG. 1 is a perspective view of a headset with an extendable microphone, consistent with an illustrative embodiment. It is to be understood that the components shown in FIG. 1 are provide for illustrative purposes, and the present disclosure is not limited to the arrangement shown. A number of the components shown are optional, and there may be more components or fewer components, and/or the components may arranged differently than shown.

With reference to FIG. 1, a headset 100 includes an extendable rod 101, an earpiece (ear clip) 130 and a headband 102. It is to be understood that the present disclosure is not limited to the headset shown in FIG. 1, and there are many variations discussed herein that are within the scope of the appended claims.

The extendable rod 101 shown in FIG. 1 has a stationary portion 110 and an extendable portion 105. In some embodiments, the extendable portion 105 telescopically extends from the stationary portion 110. A microphone 104 is arranged at a distal end of the extendable rod 101. Optional sound channels 103 are designed so a user's voice passes therethrough and is captured by the microphone 104, while serving to protect the microphone 104 from some environmental contaminants (e.g., dust, dirt, spittle, etc.)

According to some embodiments, there is an ear clip 130 that includes an ear plug 135 and/or a speaker 140. The speaker 140, which may be installed in, or on, the ear clip 130, may receive audio carried by wireless signals received by an antenna 121 using, for example, Near Field Communication (NFC), Bluetooth, Bluetooth Low Energy (LE), WiFi, etc., or similar wireless protocols. It should be noted that the antenna, or antenna array, is shown extending from the stationary portion 110 for illustrative purposes. The antenna 121 may be arranged within the headset, for example, in/on the stationary portion 110 of the extendable rod 101.

The wireless signals received by the antenna are transduced into voltages detected by a sensor 120, and the voltage signals may be forwarded to the speaker 140 or earplug 135, which are transduced into sound by the speaker 140 or earplug 135.

An actuator 115 receives signals from the sensor, and extends or retracts the extendable portion 101 to/from the stationary portion 110 in the direction shown by the arrows. According to the present disclosure, the actuator 115 may be realized in a many different forms. For example, the actuator 115 may be an air pump, a motor, or a solenoid. If the actuator 115 is an air pump, air pressure is used to move the extendable portion 105 away from the stationary portion, and vacuum to retract the extendable portion 105.

For example, with continued reference to FIG. 1, if the actuator 115 is a motor, there may be a shaft and/or gears coupled to the motor (including but not limited to a worm gear (e.g., non-throated, single throated, double-throated, etc.) and to the extendable portion 105 to extend and retract the extendable portion 105.

In some embodiments, the actuator 115 may be an air pump that may push and pull a piston connected to the extendable portion 105 by air pressure and vacuum.

Figure 2:
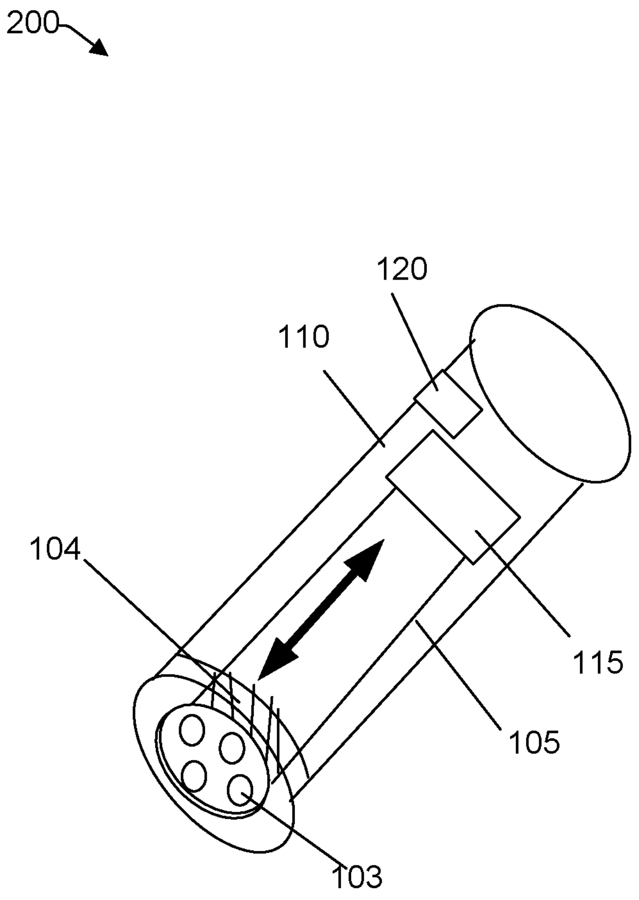
FIG. 2 illustrates a rod including a microphone in a retracted position, consistent with an illustrative embodiment.

FIG. 2 illustrates a perspective view 200 of an extendable rod 101 including a microphone in a retracted position, consistent with an illustrative embodiment. With reference to FIG. 2, it can be seen that the extendable portion 105, which is shown telescopically extended in FIG. 1, is show in a retracted position within the stationary portion 110. The actuator 115 controls the extendable portion 105 to extend so that the microphone 104 is closer to a user's mouth. This extension may occur in response to a voice activated command, or sensing that a device (e.g. a smart phone, tablet, laptop, etc.) is providing audio output to the headset. There may be an initial notice such as a ringtone, and the actuator 115 may extend the extendable portion 105 of the rod 101 automatically or in response to a voice command, etc.

The sensor 120 may be configured to detect the difference between a two-way communication such as a phone call, versus receiving music, or a voicemail, that may not require the microphone to be extended.

Figure 3A:
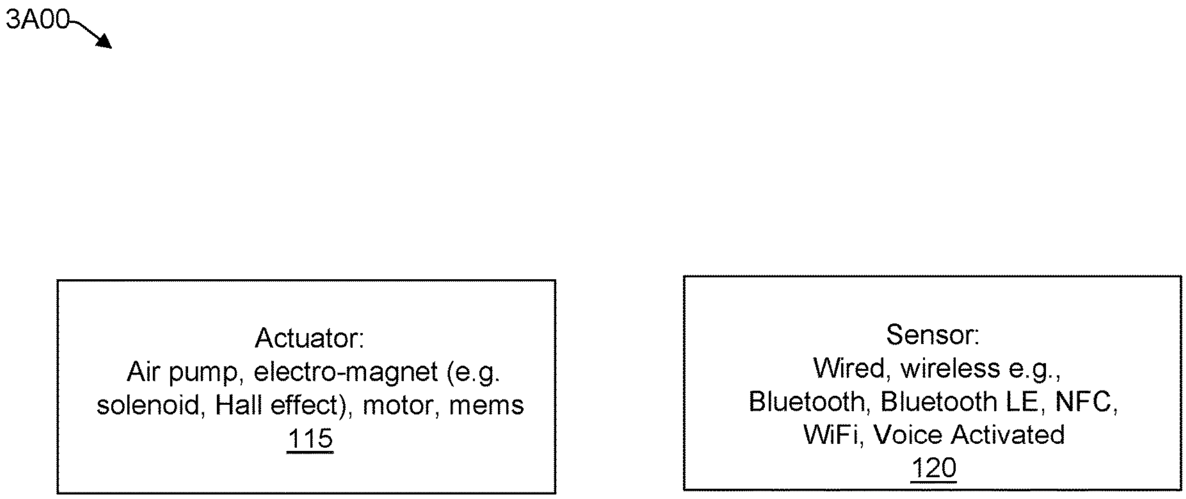
FIG. 3A is a non-limiting description of some of the actuators and sensors for a headset with an extendable microphone, consistent with an illustrative embodiment.

FIG. 3A is a non-limiting illustration 300 of some of the actuators and sensors for a headset with an extendable microphone, consistent with an illustrative embodiment. Referring to FIG. 3, the actuator 115 may be embodied include a number forms. For example, the actuator 115 may be a motor, an air pump, a solenoid, just to name some non-limiting possible forms. The extendable portion 105 may be coupled to the actuator 115 via, for example, a shaft, worm gear, piston.

The sensor 120 may be detect incoming signals received via a wired connection, wireless, such as via Bluetooth, Bluetooth LE, NFC, WiFi. The sensor may be voice-activated. In response to the user saying a particular word or phrase (e.g., "answer") the sensor 120 may provide an output signal to the actuator 115 to extend the extendable portion 105 of the rod 101 so that the microphone is closer to the user's mouth in a handsfree operation.

Figure 3B:
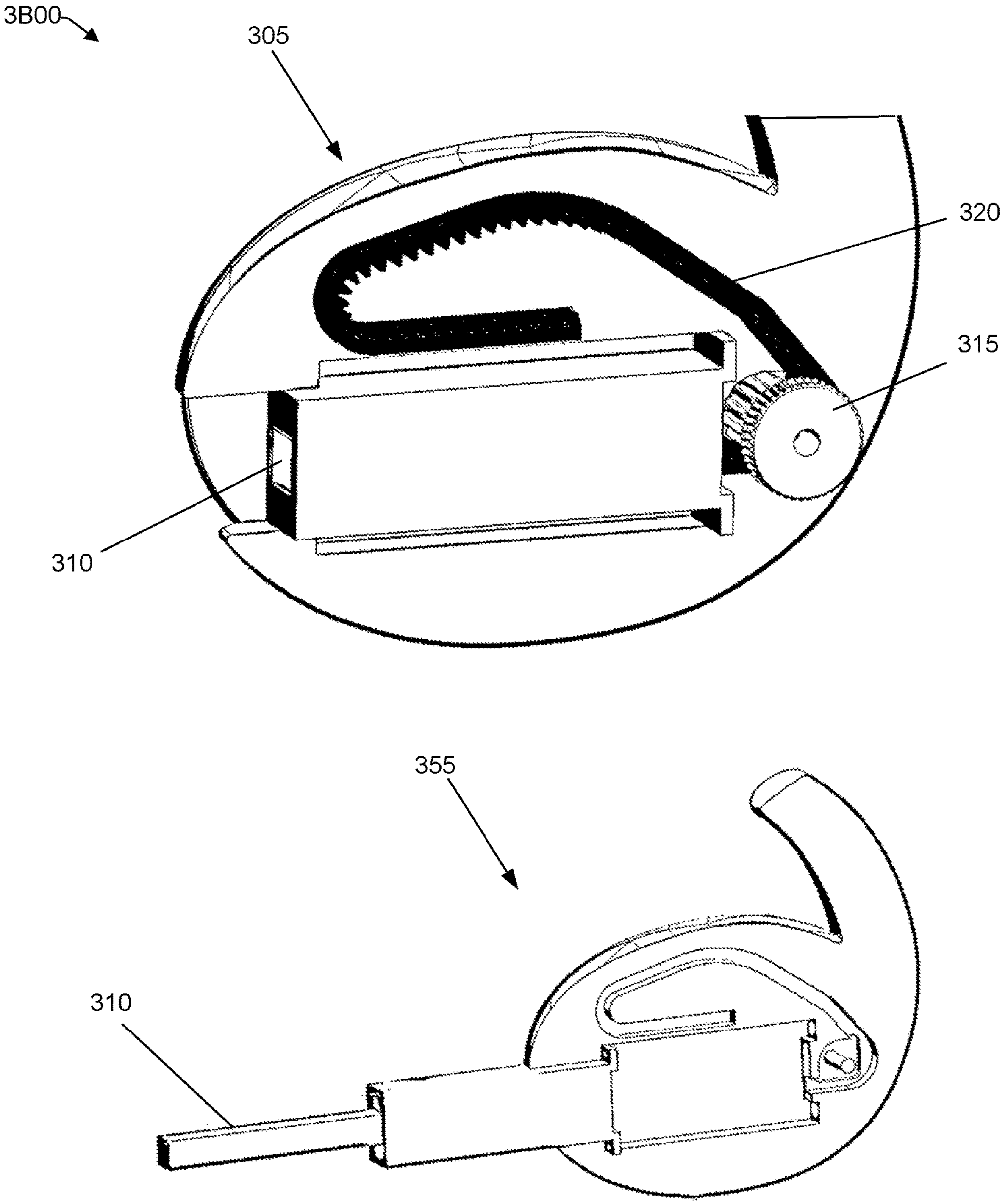
FIG. 3B illustrates side views of a headset with a handsfree extendable microphone with the rod in in retracted and extended positions, consistent with another illustrative embodiment.

FIG. 3B illustrates side views of a headset with a handsfree extendable microphone, consistent with another illustrative embodiment. The headset is shown with the rod 310 in a retracted position 305 and an extended position 355. In this illustrative embodiment, the actuator includes a gear 315 and a drive belt 320. There may be a combination of a drive gear and an idler gear that turns by motion of the drive gear. The drive belt may be arranged on the drive gear. The microphone is arranged in the rod 310, and may be arranged on the rod.

Figure 3C:
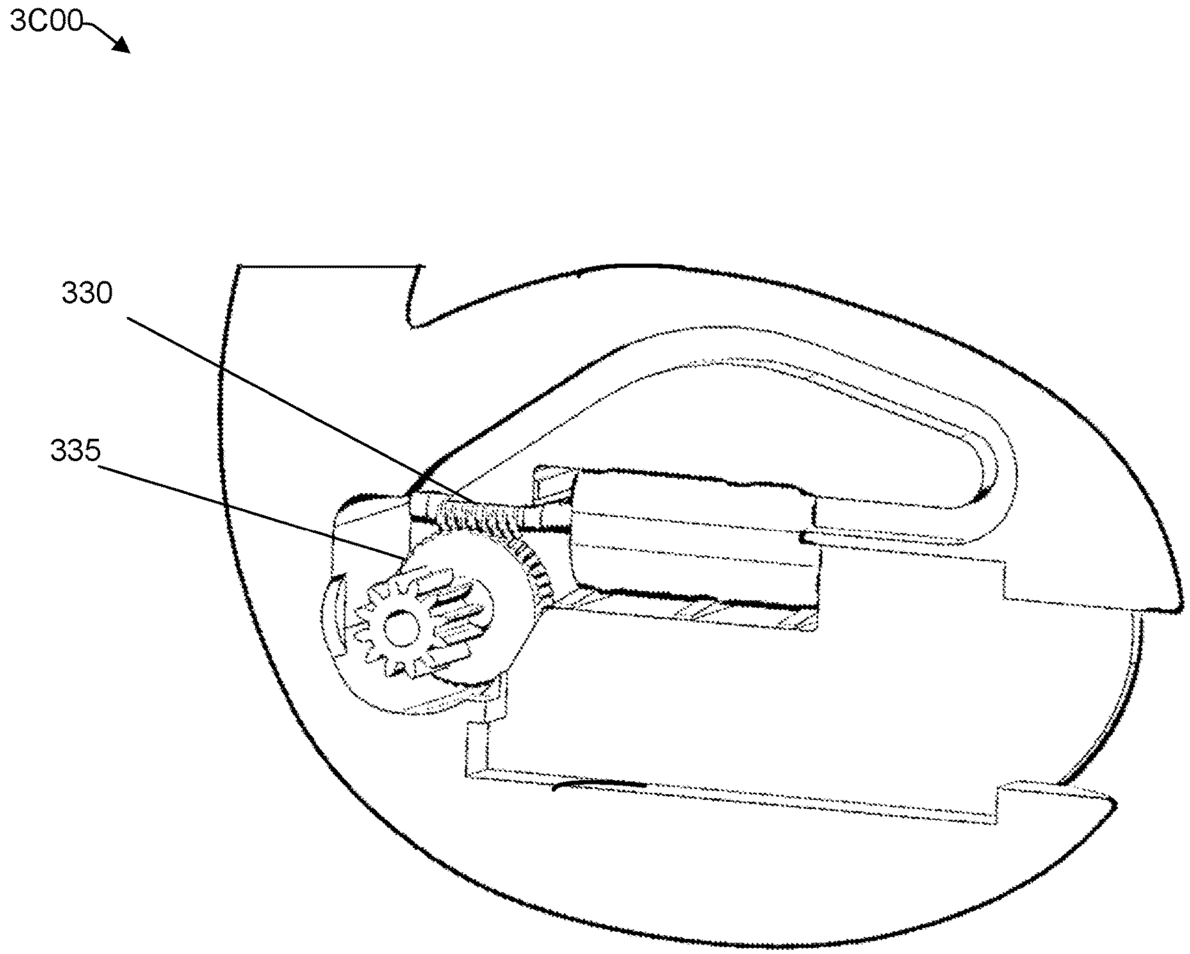
FIG. 3C illustrates another side view of a headset with a handsfree extendable microphone, consistent with another illustrative embodiment.

FIG. 3C illustrates side views of a headset with a handsfree extendable microphone, consistent with another illustrative embodiment. In this embodiment, the actuator includes a worm gear 330 and a drive gear 335 are used in combination to retract and extend the rod with the microphone.

Method of Manufacture

With the foregoing overview of the example architecture, it may be helpful now to consider a discussion of an example method of manufacturing process. To that end, FIG. 4 is a flowchart 400 illustrating a method of manufacturing a headset with a handsfree extendable microphone, consistent with an illustrative embodiment.

Figure 4:
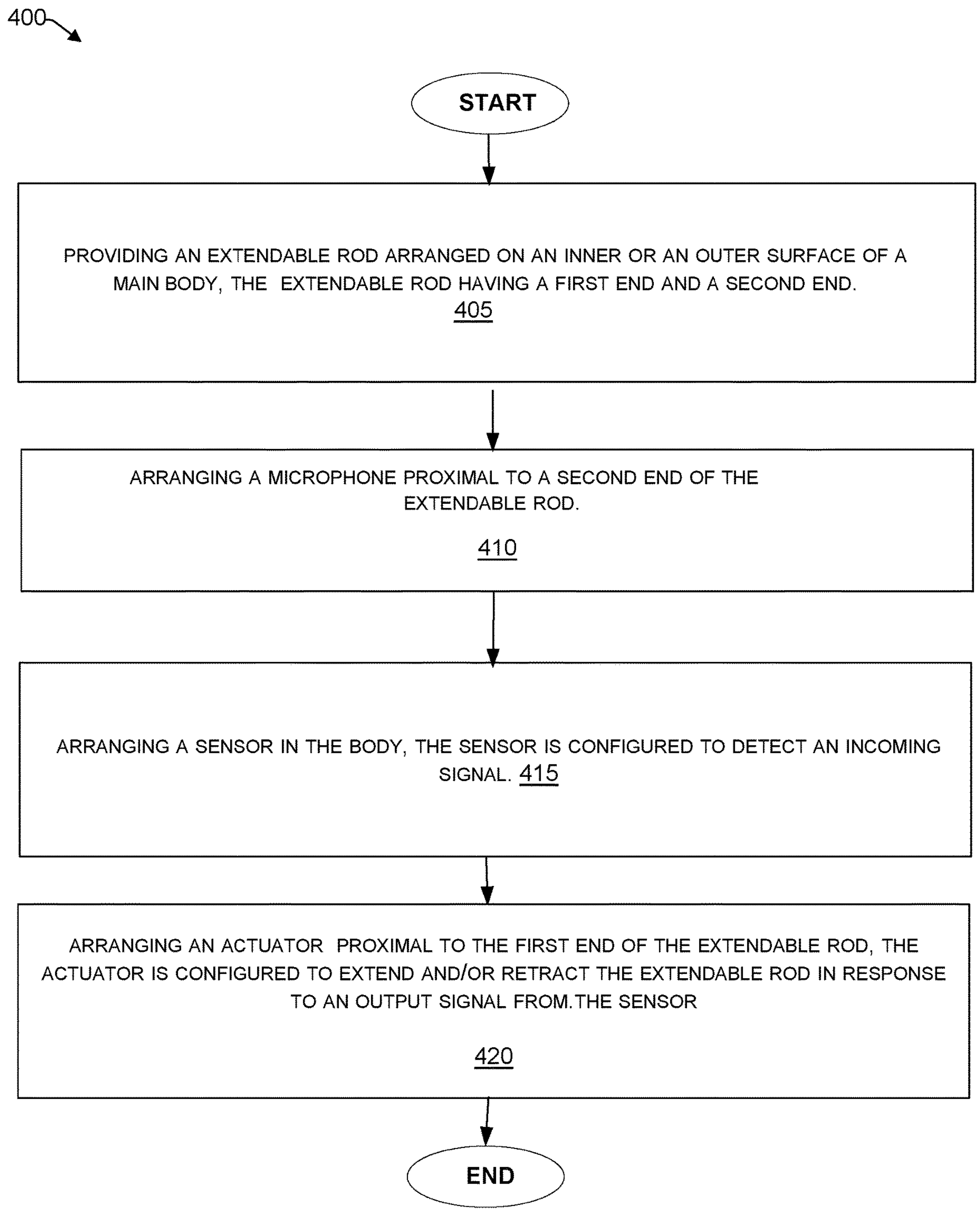
FIG. 4 is a flowchart providing an operational overview of a headset with an extendable microphone, consistent with an illustrative embodiment.

FIG. 4 is shown as a collection of blocks, in a logical order, which represents a sequence of operations that may be performed in a different order than shown and described. In each process, the order in which the operations are described is not intended to be construed as a limitation, and any number of the described blocks can be combined in any order and/or performed in parallel to implement the process.

At operation 405, an extendable rod is arranged on an inner or an outer surface of a main body, the extendable rod having a first end and a second end. The extendable rod may be a telescopically constructed rod with an extendable portion 105 and a stationary portion 110 as shown in FIG. 1 and discussed herein above, but the present disclosure is not limited to such construction.

At operation 410, a microphone 104 is arranged proximal to a second end of the extendable portion 105. The microphone 104 may be housed within the extendable portion 105, or protruding from the extendable portion. In some illustrative embodiments, there may be sound channels 103 (shown in FIG. 1) in front of or on the microphone 104.

At operation 415, a sensor 120 is arranged in the body of the headset, such as in the stationary portion 110. The sensor is configured to detect an incoming signal, and may be coupled to an antenna 121.

At operation 420, an actuator 115 is arranged proximal to the first end of the extendable rod 101 (such as in the extendable portion 105), the actuator 115 is configured to extend and/or retract the extendable rod in response to an output signal from the sensor 120. The actuator 115 may be constructed in one of the non-limiting illustrative examples disclosed hereinabove.

While several illustrative embodiments of the present disclosure have been shown and described, numerous variations and alternative embodiments will occur to those skilled in the art. Such variations and alternative embodiments are contemplated, and can be made without departing from the scope of the disclosure as defined in the appended claims.

As used in this specification and the appended claims, the singular forms "a,' 'an," and "the" include plural referents unless the content clearly dictates otherwise. The term plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, paragraph (f), unless the element is expressly recited using the phrase "means for. and no method or process step herein is to be construed under those provisions unless the step, or steps, are expressly recited using the phrase "step(s) for . . . "

What is claimed is:

1. A headset comprising:

a body;

at least one earpiece connected to the body, the at least one earpiece including a speaker;

an extendable rod arranged on an inner or an outer surface of the body, the extendable rod having a first end and a second end;

a microphone arranged proximal to the second end of the extendable rod;

a sensor arranged in the body, the sensor is configured to detect an incoming signal; and an actuator attached proximal to the first end of the extendable rod, the actuator is configured to extend and/or retract the extendable rod in response to an output signal from the sensor.

2. The headset according to claim 1, wherein the actuator comprises a motor configured to control the extendable rod.

3. The headset according to claim 1, wherein the extendable rod comprises a plurality of telescopically connected portions.

4. The headset according to claim 1, wherein the sensor detects the incoming signal from a wirelessly coupled device.

5. The headset according to claim 1, wherein the sensor comprises a voice-activated sensor configured to extend and retract the extendable rod in response to detection of a respective command.

6. The headset according to claim 1, further comprising an antenna coupled to the sensor.

7. The headset according to claim 6, wherein the sensor detects the incoming signal in a wireless signal transmitted in one of Bluetooth, Bluetooth Low Energy (LE), 802.11 (a) to end, WiFi 1 to WiFi 7, or near-field communication (NFC).

8. The headset according to claim 1, wherein the sensor comprises a voice activated sensor that outputs a signal to the actuator to control the extendable rod to extend and/or retract based on voice commands.

9. The headset according to claim 1, wherein the actuator comprises an air pump configured to pneumatically control the extendable rod.

10. The headset according to claim 1, wherein the actuator comprises a hydraulic pump configured to control the extendable rod.

11. The headset according to claim 1, wherein the actuator comprises a solenoid configured to control the extendable rod.

12. The headset according to claim 1, further comprising an optical sensor arranged in the extendable rod, the optical sensor is configured to detect a user's mouth and output a signal to the actuator.

13. A headphone comprising:

at least one earpiece comprising a speaker;

a rod connected to the at least one earpiece, the rod having a first end and a second end, and the rod is configured to telescopically extend and retract;

a microphone attached proximal to the second end of the rod;

a sensor arranged in the rod, the sensor is configured to detect an incoming signal; and an actuator coupled to the rod, the actuator is configured to extend and retract the rod having the microphone attached, in response to an output signal received by the sensor.

14. The headset according to claim 13, further comprising a voice activated sensor that is configured to trigger the actuator to extend and retract the rod according to a respective voice command.

15. The headset according to claim 14, wherein the actuator comprises a motor configured to extend and retract the rod.

16. The headset according to claim 15, further comprising an antenna coupled to the sensor; and wherein the sensor detects the incoming signal in a wireless signal transmitted in one of Bluetooth, Bluetooth Low Energy (LE), 802.11 (a) to end, WiFi 1 to WiFi 7, or near-field communication (NFC).

17. A method of manufacturing a headset with an automatic handsfree extendable microphone, the method comprising:

providing at least one earpiece to a body;

connecting a telescoping rod to the body, the rod having a first end and a second end, and the rod is operative to extend and retract;

attaching a microphone proximal to the second end of the rod;

arranging a sensor in the rod, the sensor is operative to detect an incoming signal; and coupling an actuator to the rod, the actuator is operative to extend and retract the rod having the microphone attached, in response to an output signal received by the sensor.

18. The method according to claim 17, wherein the actuator comprises a motor, and the method further comprises attaching a shaft to the motor and to the rod to extend and retract the rod.

19. The method according to claim 17, wherein the actuator comprises an air pump, and the method further comprises attaching an air powered piston to the air pump and to the rod to extend and retract the rod.

20. The method according to claim 17, further comprising coupling an antenna to the sensor.

* * * * *